Patented Nov. 28, 1922.

1,437,191

UNITED STATES PATENT OFFICE.

IRA PAUL, OF BROOKLYN, NEW YORK, ASSIGNOR TO METAL & THERMIT CORPORATION, OF CHROME, NEW JERSEY, A CORPORATION OF NEW JERSEY.

PROCESS FOR ELIMINATING PHOSPHORUS FROM METALLIC SOLUTIONS.

No Drawing. Application filed January 20, 1922. Serial No. 530,662.

*To all whom it may concern:*

Be it known that I, IRA PAUL, a citizen of the United States, residing at Brooklyn, in the county of Kings and State of New York, have invented a certain new and useful Process for Eliminating Phosphorus from Metallic Solutions; and I do hereby declare the following to be a full, clear, and exact description of the invention, such as will enable others skilled in the art to which it appertains to make and use the same.

The invention relates to a process for eliminating phosphorus from ores and compounds containing metallic values, more particularly refractory metals such as vanadium, uranium, chromium and molybdenum. In the treatment of ores and compounds containing the refractory metals, or various admixtures of such metals with iron, for the purpose of obtaining the metallic values either singly or in alloy form, for use in the steel industry, it is necessary that the purity of the metallic values be relatively high. It is a well known fact, however, that phosphorus, which is a particularly harmful element when associated with these metallic values, occurs in nearly all ores and compounds of the refractory metals, and many attempts have been made to eliminate the phosphorus in a practical and economical manner, but without success.

The present invention provides a simple, highly efficient and inexpensive mode of eliminating the phosphorus content of ores and compounds containing the refractory metals, so that the latter may be recovered in a substantially pure state, either individually or in various alloys suitable for use in producing high-grade alloy steels. According to my invention, the compounds, ores or admixtures containing the refractory metal values of the character indicated, are first brought into solution by rotating, fusing, leaching, or by any of the well known methods of treating such ores to bring all the soluble elements thereof into solution. If the resulting solution, separated from any solid residuum, is not in an acid state, it is acidified by the addition of an excess of mineral acid such as hydrochloric or sulphuric acid, which has the effect of converting any contained iron, aluminum, vanadium, uranium, or similar metallic values into chlorides, and any contained silica into silicic acid. The acidity of the resulting solution is then reduced by the addition of a suitable alkaline reagent, such, for example as soda-ash, caustic alkali, or the like, to such a point that the silicious material is precipitated. The precipitate is then separated by filtration or other suitable procedure, and the filtrate is still further treated until it is only slightly acid in reaction, by a further addition of the alkaline reagent. To the filtrate solution there is added an aluminum compound, such as alum, either in solid form or in solution, and the admixture agitated, and the metallic values precipitated from the solution by the addition of a suitable oxidizing agent, such as nitrates, chlorates or chromates of the alkaline metals. During this treatment, the phosphorus will combine with the aluminum of the aluminum compound, for which the phosphorus has a greater affinity than it has for the refractory metals or for iron, and the aluminum phosphorus compound will remain in solution, while practically all of the desired metallic values are precipitated, and may be readily recovered by filtration or other means, and after being thoroughly washed, are found to be substantially free from phosphorus.

If iron is present in the ore or compound, the final metallic product will also contain the iron associated with the other metallic values. For example, if an ore or compound containing iron and vanadium is subjected to the successive steps of the processes indicated, the resultant product is an iron vanadate free from phosphorus and capable of immediate use in the manufacture of vanadium steel. Any other refractory metallic values of the character indicated may be similarly recovered, either singly or in admixture, one with another, according to the content of the original ore or compound, substantially free from phosphorus and any silicious element of the original ore.

What I claim is:

1. The method of eliminating phosphorus from ores or compounds containing refractory metallic values, which comprises forming an acid solution of said compound, reducing the acidity of the solution by the addition of an alkaline reagent, treating the solution with an aluminum compound and a precipitating agent, and separating the precipitate refractory metal values.

2. The method of eliminating phosphorus from an acid solution of refractory metals, which comprises reducing the acidity of the solution by the addition of an alkaline reagent, treating the solution with an aluminum compound and a precipitating agent, and separating the precipitate refractory metal values.

3. The method of eliminating phosphorus from solutions of refractory metals which comprises acidifying the solution, reducing the acidity of the solution by the addition of an alkaline reagent to percipitate silicious material, separating the precipitate, treating the residual solution with an aluminum compound and a precipitating agent, and separating the precipitate refractory metal values.

IRA PAUL.